April 17, 1956 J. M. URITIS 2,742,536

MAGNETIC RECORDING APPARATUS

Filed Sept. 30, 1954

INVENTOR.
Joseph M. Uritis
BY
Morris A. Rabkin
ATTORNEY.

United States Patent Office 2,742,536
Patented Apr. 17, 1956

2,742,536

MAGNETIC RECORDING APPARATUS

Joseph M. Uritis, Haddonfield, N. J., assignor to Radio Corporation of America, a corporation of Delaware Application September 30, 1954, Serial No. 459,484

6 Claims. (Cl. 179—100.2)

This invention relates to magnetic recording and more particularly to means for obtaining an extremely fine azimuth adjustment of the transducer used in a magnetic recording-reproducing system.

In a number of instances, it has become desirable to employ magnetic records such that a number of record tracks are placed side by side and extend longitudinally of a tape record. It frequently happens that the signals in the separate record tracks must bear a very close phase relationship with each other. If the signals are recorded on the tape in a high concentration, say on the order of 5,000 to 10,000 cycles per inch, then a slight deviation from an accurate azimuth adjustment will result in considerable phase difference in the signals in remote channels or tracks of the tape. For most purposes, and for initial adjustment of the azimuth of a recording-reproducing transducer as just set forth, conventional azimuth adjusting means may be satisfactory. However, in the multichannel, high concentration recording systems set forth, an extremely fine adjustment must be made.

It is, accordingly, an object of the present invention to provide improved means for effecting an extremely fine azimuth adjustment of a magnetic record transducer.

It is another object of this invention to provide an improved azimuth adjusting means as set forth which is characterized in simplicity of structure and operation.

In accomplishing these and other objects, there has been provided in accordance with the present invention, a support arm for a magnetic record transducer. The transducer support arm is provided with a deformable element which when deformed in one general direction produces a change in another direction of the position of a transducer holding element.

Figures 1, 2:
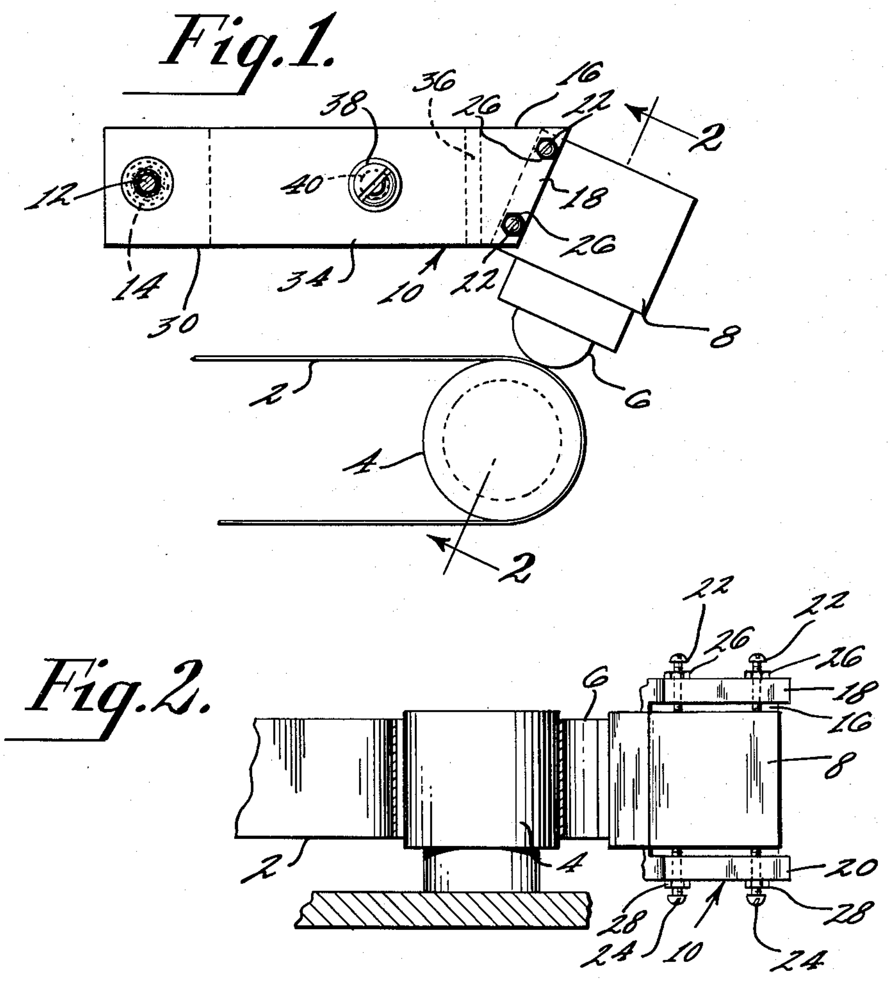
Figure 3:
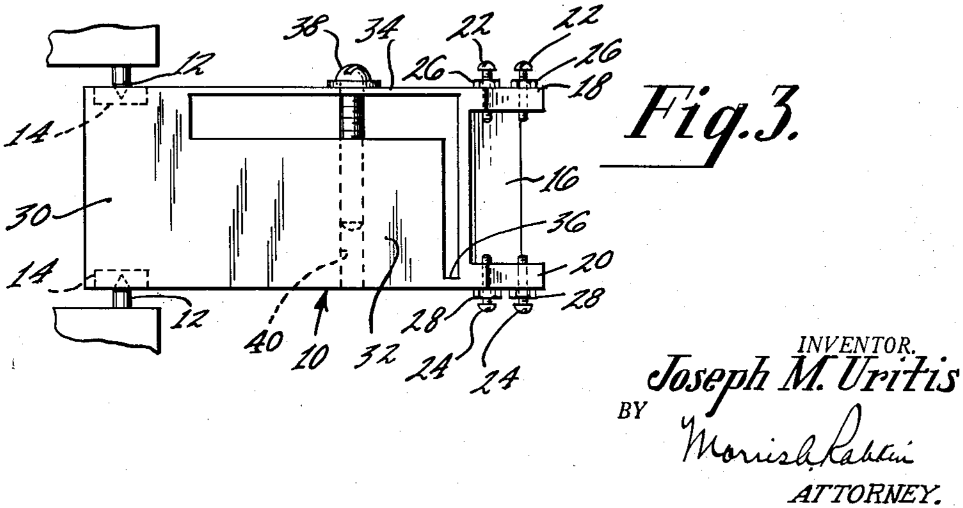

A better understanding of this invention may be had from the following detailed description when read in connection with the accompanying drawing in which:

Fig. 1 is a plan view of a portion of a magnetic recording system embodying the present invention, Fig. 2 is a view partly in section taken along the line 2—2 of Fig. 1 and viewed in the direction of the arrows, and Fig. 3 is an elevational view of a transducer support arm embodying the present invention.

Referring now to the drawing in more detail, there is shown a magnetic record member 2 which passes around a roller member 4. It will be appreciated that the roller member 4 may be a driving capstan or a flywheel stabilized roller. A magnetic record transducer 6 which is carried in a housing 8, is positioned to engage the outer surface of the tape record member 2 as it passes around the roller 4.

A support arm 10 is pivotally mounted on a set of pivots 12 which engage corresponding bearings 14. The arm 10 extends forwardly from the pivoted end to a transducer clamping bracket 16. The bracket 16 is adapted to hold a magnetic record transducer securely with respect to the bracket 16. As an illustrative example of such a bracket, there are shown, in the drawing, upper and lower shoulders 18 and 20, respectively. These shoulders embrace the edge of the transducer housing 8 between them. A pair of clamping screws 22 extend through the shoulder 18 and engage the edge of the transducer housing. A similar pair of clamping screws 24 extend through the shoulder 20 and engage the opposite edge of the housing 8. Suitable lock-nuts 26 are provided for the screws 22. Lock-nuts 28 are also provided for the screws 24. These four screws may be tightened to lock the housing 8 and, hence, the transducer 6, firmly on the end of the arm 10. The arm 10 is formed with a rigid end or support portion 30 in the vicinity of the axis of the pivot means 12 and the bearing 14. Extending forwardly from the end or support portion 30, toward the bracket 16, are two legs. One of these legs 32 is relatively rigid and may be integral with the end portion 30. The second leg 34 extends in spaced, parallel relation to the rigid leg 32. This leg 34 is not rigid, as is the first mentioned leg 32, but is deformable with respect to that first leg. The deformable or flexible leg 34 is secured directly, in the illustrated embodiment, to one end of the bracket 16. The rigid leg 32 is connected to the other end of the bracket 16 by a short, flexible or deformable link 36. Means are provided for selectively deforming the leg 34. This means may include a headed screw 38 which passes through the deformable leg 34 and into a threaded hole 40 in the rigid leg 32.

Assume that a suitable transducer 6 has been mounted in the bracket 16. The transducer may be initially adjusted with respect to the tape 2 and the roller 4 by any well known technique. For an extremely fine adjustment, the headed screw 38 is turned to effect a deformation of the deformable leg 34. For example, tightening the screw 38 causes the leg 34 to be flexed toward the leg 32. The pivot axis constitutes a relatively fixed reference line. The lower leg 32 (as viewed in Fig. 3) is rigid and remains unchanged in length. However, the flexing of the upper leg 34 results in an effective shortening of the upper leg with respect to the distance between the bracket 16 and the pivot axis. This causes the upper end of the bracket 16 to be slightly tilted back toward the pivot axis. The bracket 16 tilts about its lower end, the deformable link 36 acting as a hinge. The tilting of the bracket effects an azimuth adjustment of the transducer carried thereby. If the flexible leg 34 had been given an initial deformation by means of the screw 38, then a slight adjustment in either direction is available.

The bracket 16 is shown as supporting the transducer 6 at an angle to the major axis of the arm 10. That angle is so chosen that a radial line drawn through the roller 4, at the point of tangency between the roller and the transducer passes through the center of the transducer 6 and is perpendicular to a line drawn from the axis of the pivots 12 tangential to the surface of the roller. Such an arrangement minimizes the deleterious effect upon a reproduced signal of any slight eccentricity which may be present in the roller 4.

There has thus been provided an improved means for effecting an extremely fine azimuth adjustment of a magnetic record transducer which is characterized in simplicity of structure and operation.

What is claimed is:

1. In a magnetic recording system, a magnetic record transducer, a support arm for said transducer, said arm including a transducer holding bracket, a rigid support portion, a first and a second leg extending from said rigid support portion toward said bracket, said first one of said legs being substantially rigid with respect to said support portion, said second leg being deformable with respect to said first leg, a deformable link, said first leg being secured to said bracket by said deformable link, said second leg being directly secured to said bracket, and means for selectively deforming said second leg whereby to effect an azimuth adjustment of said transducer.

2. In a magnetic recording system, a magnetic record transducer, a support arm for said transducer, said arm including a transducer holding bracket, a rigid support portion, a first and a second leg extending from said support portion toward said bracket, said first leg being substantially rigid with respect to said support portion, said second leg being deformable with respect to said first leg, a deformable link, said first leg being secured to said bracket by said deformable link, said second leg being directly secured to said bracket, and screw means cooperatively associated with said legs for selectively deforming said second leg with respect to said first leg whereby to effect an azimuth adjustment of said transducer.

3. The invention set forth in claim 2 wherein said first leg is integral with said support portion.

4. In a magnetic recording system including a magnetic record transducer, a support arm for the transducer, said arm comprising a rigid transducer bracket, a rigid support arm, a first and a second leg extending in spaced parallel relation with respect to each other and toward said bracket, said first leg being rigid with respect to said support portion, said second leg being deformable with respect to said first leg, a deformable link, said first leg being secured to said bracket by said deformable link, said second leg being directly secured to said bracket, and means for selectively deforming said second leg with respect to said first leg whereby to effect an azimuth adjustment of said transducer.

5. The invention as set forth in claim 4 wherein said second leg is deformable in flexure.

6. The invention as set forth in claim 5 wherein said means for deforming said second leg comprises screw means passing through said second leg and threaded into said first leg.

References Cited in the file of this patent

UNITED STATES PATENTS 2,644,856 Pettus ---------------- July 7, 1953